(12) United States Patent
Lim et al.

(10) Patent No.: US 8,749,643 B2
(45) Date of Patent: Jun. 10, 2014

(54) SUSPENSION WIRE FOR COMPENSATING FOR HAND VIBRATION AND IMAGE PHOTOGRAPHING DEVICE HAVING THE SAME

(75) Inventors: Soo Cheol Lim, Gyeonggi-do (KR); Sang Min On, Seoul (KR); Byung Woo Kang, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 75 days.

(21) Appl. No.: 13/397,191

(22) Filed: Feb. 15, 2012

(65) Prior Publication Data

US 2012/0224075 A1  Sep. 6, 2012

(30) Foreign Application Priority Data

Mar. 2, 2011 (KR) .................. 10-2011-0018486

(51) Int. Cl.
*H04N 5/228* (2006.01)

(52) U.S. Cl.
USPC ........ 348/208.11; 396/55; 396/133; 396/529; 359/557

(58) Field of Classification Search
USPC ........ 348/208.11; 396/55, 133, 529; 359/557, 359/824
See application file for complete search history.

(56) References Cited

U.S. PATENT DOCUMENTS

| | | | |
|---|---|---|---|
| 2003/0209417 A1* | 11/2003 | Yoneyama | ............... 200/344 |
| 2004/0228230 A1 | 11/2004 | Matsui | |
| 2007/0103555 A1 | 5/2007 | Eromaki | |
| 2008/0144200 A1* | 6/2008 | Kim et al. | ............... 359/824 |
| 2009/0303594 A1 | 12/2009 | Lim et al. | |
| 2010/0002301 A1* | 1/2010 | Lee et al. | ............... 359/557 |
| 2010/0265343 A1 | 10/2010 | Lee et al. | |
| 2011/0058799 A1* | 3/2011 | Chung et al. | ............... 396/55 |

FOREIGN PATENT DOCUMENTS

| | | |
|---|---|---|
| EP | 2141915 | 1/2010 |
| KR | 10-2010-0001519 | 1/2010 |
| KR | 10-2010-0066678 | 6/2010 |
| KR | 10-2010-0093263 | 8/2010 |

OTHER PUBLICATIONS

Korean Office Action issued Jun. 11, 2012 in corresponding Korean Patent Application No. 10-2011-0018486.
Extended European Search Report dated Jul. 18, 2012 issued in corresponding European Patent Application No. 12275009.4.

* cited by examiner

*Primary Examiner* — Antoinette Spinks

(57) ABSTRACT

Disclosed herein are a suspension wire for compensating for hand vibration and an image photographing device having the same. The suspension wire for compensating for hand vibration, which is mounted between an optical unit and a housing so as to have a length thereof in an optical axis direction to float and support the optical unit within the housing, includes: a wire body having both ends thereof each fixed to the optical unit and the housing; and a deformation buffer formed in the wire body to allow the wire body to flexibly receive impact force when external impact is applied to the wire body, thereby preventing permanent deformation or fracture of the wire body.

12 Claims, 8 Drawing Sheets

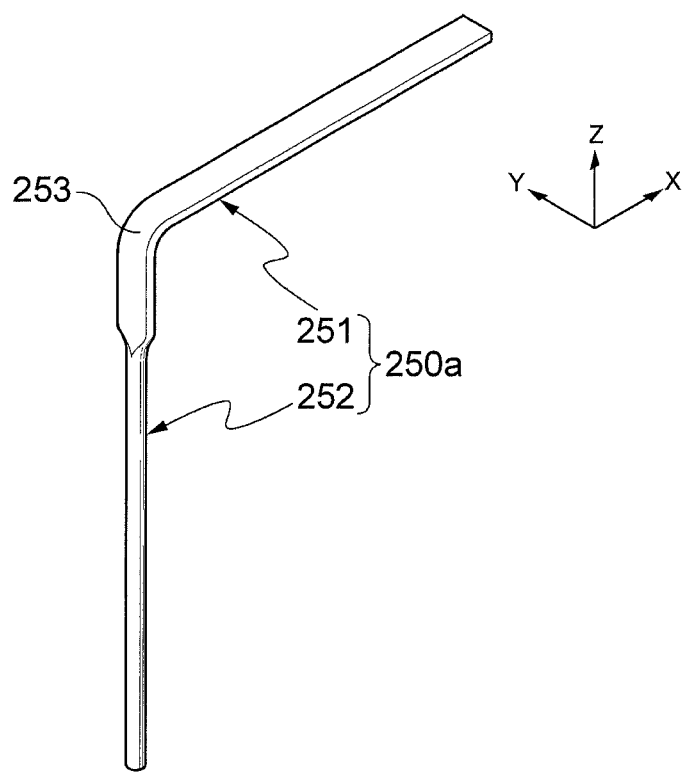

SUSPENSION WIRE FOR COMPENSATING FOR HAND VIBRATION AND IMAGE PHOTOGRAPHING DEVICE HAVING THE SAME

CROSS REFERENCE(S) TO RELATED APPLICATIONS

This application claims the benefit under 35 U.S.C. Section 119 of Korean Patent Application Serial No. 10-2011-0018486, entitled "Suspension Wire For Compensating For Hand Vibration And Image Photographing Device Having The Same" filed on Mar. 2, 2011, which is hereby incorporated by reference in its entirety into this application.

BACKGROUND OF THE INVENTION

1. Technical Field

The present invention relates to a suspension wire for compensating for hand vibration and an image photographing device having the same, and more particularly, to a suspension wire for compensating for hand vibration in which a shape and a supporting structure of the suspension wire supporting an optical unit are changed to prevent permanent deformation or fracture of the suspension wire due to external impact, and an image photographing device having the same.

2. Description of the Related Art

Recently, use of a subminiature camera module for a mobile has gradually increased in a mobile device such as a mobile phone, a notebook, a tablet PC, or the like. The demand of customers for the subminiature camera used in the mobile device and having a high pixel of five million pixels or more and a multi-function such as a zoom function, an auto focus (AF) function, and the like has increased.

Generally, a camera module used in the mobile device may be configured to include an optical system having a lens, a lens moving unit moving the optical system in an optical axis direction to adjust a focus, and an image sensor photographing light input through the optical system to convert the photographed light into an image signal.

As the number of pixels of the camera module is increased, the size of the pixel becomes small and the receiving sensitivity of the light photographed in the image sensor becomes sensitive, and the image photographed in the image sensor is out of focus even with small hand vibration when operating a shutter of the camera or the mobile device, such that image quality is deteriorated. Therefore, it is impossible to obtain a sharp photograph.

The deterioration of the image quality due to the hand vibration is generated because the light passing through the lens of the optical system is out of the optical axis of the lens. Therefore, in order to prevent the deterioration of the image quality due to the hand vibration, the lens is moved in directions perpendicular to the optical axis to coincide the optical axis of the lens with an incident pass of the light or the image sensor is moved in directions perpendicular to the optical axis to coincide the optical axis with the incident pass of the light received in the image sensor, thereby compensating for the hand vibration.

That is, the lens or the image sensor is relatively displaced in the directions perpendicular to the optical axis, respectively, thereby making it possible to compensate for the hand vibration.

In a scheme in which the lens or the image sensor is relatively displaced to compensate for the hand vibration, generally, a two-axis guide supporting the lens in a T shape or an L shape is mounted, such that the lens is moved in the relative direction of moving displacement generated due to the hand vibration while being moved in directions perpendicular to the optical axis along the two-axis guide, thereby compensating for the hand vibration.

Here, when the lens is moved along the two-axis guide, compensation performance may be deteriorated due to the friction between the two-axis guide and the lens, and when the two-axis guide and the lens are moved or the two-axis guide is moved, noise or foreign materials may occur due to the friction with other components.

In addition, since the two-axis guide supports the periphery of the lens, the size of the camera module cannot but be enlarged by a space in which the two-axis guide is mounted.

Meanwhile, in order to reduce noise or the foreign material, a scheme of moving the optical unit in directions perpendicular to the optical axis in a state in which the optical unit is supported and floated through a suspension wire may be used. Here, the optical unit is moved in the relative direction of moving displacement generated due to the hand vibration by electromagnetic force in a state in which it is supported by the suspension wire, thereby compensating for the hand vibration.

In the hand vibration compensation device in the above-mentioned scheme, friction between the optical unit and other components does not occur during the movement of the optical unit, such that noise and foreign material due to the friction do not occur, thereby making it possible to minimize performance deterioration.

However, when an image photographing device is mounted in an actual mobile device and has external impact such as dropping, etc., applied thereto, compressive stress or tensile stress is applied to the suspension wire supporting the optical unit. When these stresses exceed yield stress of the suspension wire itself, deformation of the suspension wire such as warpage, fracture, or the like, occurs.

That is, when one or more axis of the suspension wire supporting the optical unit is deformed, a hand vibration compensation function may be deteriorated or slanted, and when the suspension wire is fractured, the hand vibration compensation function itself may become impossible.

In order to prevent these problems, a diameter of the suspension wire may be enlarged to increase the yield stress thereof. However, in the case in which the diameter of the suspension wire is enlarged, spring stiffness increases in directions perpendicular to an optical axis, such that moving performance of the hand vibration compensation may be deteriorated and a size of a moving member may be increased, thereby causing an increase in the entire size of the image photographic device having the hand vibration compensation function.

SUMMARY OF THE INVENTION

An object of the present invention is to provide a suspension wire for compensating for hand vibration in which a deformation buffer is formed in a wire body supporting an optical unit to prevent and minimize permanent deformation or facture of the suspension wire due to external impact while smoothly maintaining moving performance of hand vibration compensation, such that performance and accuracy for hand vibration compensation and auto-focusing of an image photographing device may be improved and reliability of a product may also be improved, and an image photographing device having the same.

According to an exemplary embodiment of the present invention, there is provided image photographing device including: an optical unit; a housing having the optical unit received therein; and a suspension wire for compensating for hand vibration mounted between the optical unit and the housing so as to have a length thereof in an optical axis direction to float and support the optical unit within the housing, wherein the suspension wire for compensating for hand vibration includes: a wire body having both ends thereof each fixed to the optical unit and the housing; and a deformation buffer formed in the wire body to allow the wire body to receive impact force when external impact is applied to the wire body.

The wire body may be formed in a form in which each of upper and lower ends thereof is fixed to the optical unit and the housing, and the deformation buffer may be formed between the upper and lower ends of the wire body.

The deformation buffer may have a cross section of which a width and a height have a different ratio therebetween in order to flexibly receive the impact force acting on the wire body when external impact is generated while smoothly maintaining movement performance of hand vibration compensation of the optical unit floated and supported by the wire body, thereby preventing or minimizing permanent deformation or fracture of the suspension wire.

The deformation buffer may include a first deformation buffer and a second deformation buffer each formed in upper and lower portions of the wire body.

The first and second deformation buffers may have cross sections that form a predetermined angle therebetween. For example, the first and second deformation buffers may have cross sections that are rotationally symmetrical to each other by 90 degrees to flexibly cope with deformation force applied to the wire body in a surface direction perpendicular to the optical axis direction, that is, a movement direction of hand vibration compensation, thereby making it possible to prevent or minimize the permanent deformation or the fracture of the wire body, that is, the suspension wire.

The wire body may be formed in a bent shape in which it includes a horizontal wire body fixed to the optical unit and a vertical wire body fixed to the housing, and the deformation buffer may be formed in at least any one of the horizontal wire body and the vertical wire body.

The deformation buffer may have a cross section of which a width and a height have a different ratio therebetween in order to flexibly receive the impact force acting on the wire body when the external impact is generated while smoothly maintaining movement performance of hand vibration compensation of the optical unit floated and supported by the wire body, thereby preventing or minimizing permanent deformation or fracture of the suspension wire.

The deformation buffer may include at least any one of a horizontal deformation buffer formed in the horizontal wire body and a vertical deformation buffer formed in the vertical wire body.

The horizontal deformation buffer may be formed to be extended to a bent portion at which the horizontal wire body and the vertical wire body are connected to each other.

The vertical deformation buffer may include a first vertical deformation buffer and a second vertical deformation buffer each formed in upper and lower portions of the vertical wire body.

The first and second deformation buffers may have cross sections that form a predetermined angle therebetween. For example, the first and second deformation buffers may have cross sections that are rotationally symmetrical to each other by 90 degrees to flexibly cope with deformation force applied to vertical the wire body in a surface direction perpendicular to the optical axis direction, that is, a movement direction of hand vibration compensation, thereby making it possible to prevent or minimize the permanent deformation or the fracture of the wire body, that is, the suspension wire.

According to another exemplary embodiment of the present invention, there is provided a suspension wire for compensating for hand vibration, which is mounted between an optical unit and a housing so as to have a length thereof in an optical axis direction to float and support the optical unit within the housing, the suspension wire including: a wire body having both ends thereof each fixed to the optical unit and the housing; and a deformation buffer formed in the wire body to allow the wire body to receive impact force when external impact is applied to the wire body.

BRIEF DESCRIPTION OF THE DRAWINGS

FIG. 5 is a perspective view schematically showing a suspension wire for compensating for hand vibration according to a second embodiment of the present invention;

DESCRIPTION OF THE PREFERRED EMBODIMENTS

The acting effects and technical configuration with respect to the objects of a suspension wire for compensating for hand vibration and an image photographic device having the same according to the present invention will be clearly understood by the following description in which exemplary embodiments of the present invention are described with reference to the accompanying drawings.

Hereinafter, a suspension wire for compensating for hand vibration and an image photographic device having the same according to the present invention will be described with reference to the accompanying drawings.

Figure 1:
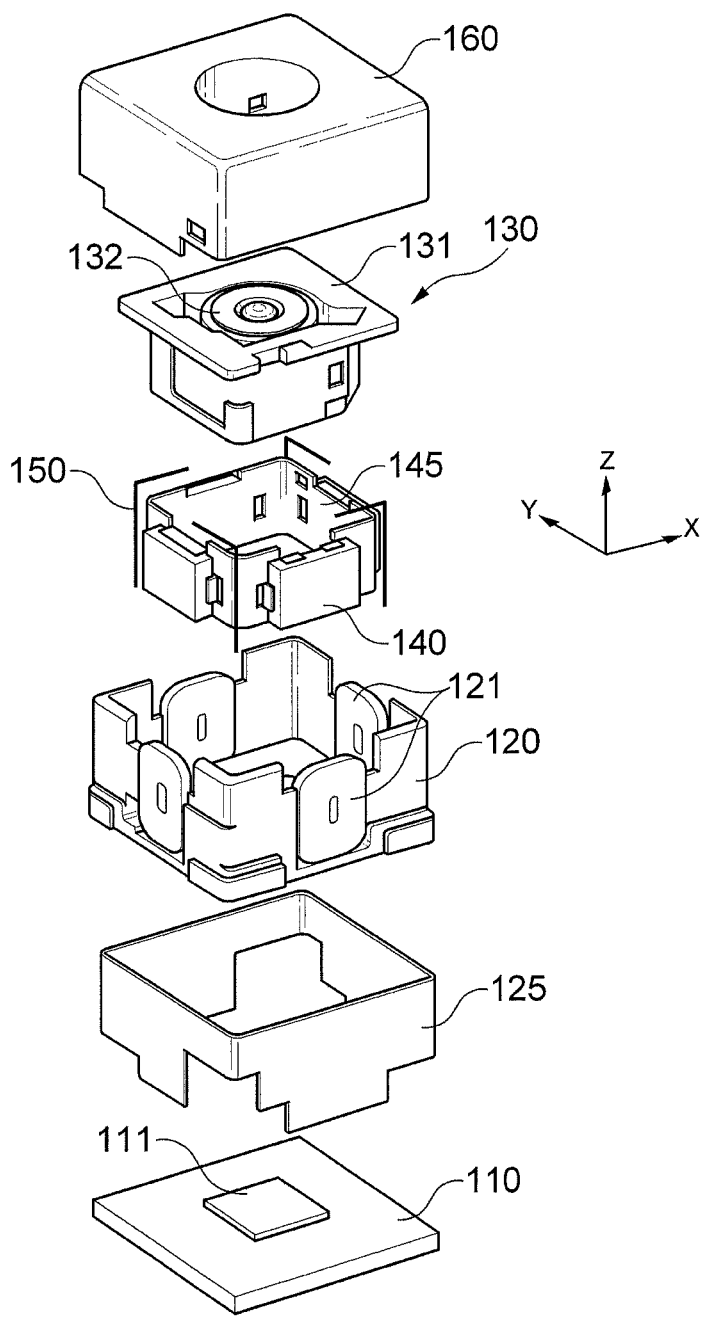
FIG. 1 is an exploded perspective view schematically showing an image photographing device having a suspension wire for compensating for hand vibration according to a first embodiment of the present invention.
Figure 2:
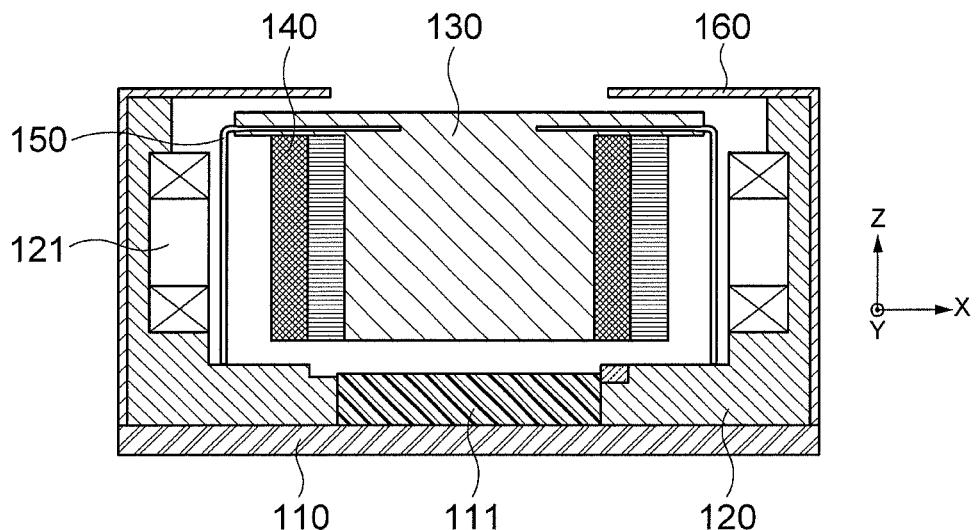
FIG. 2 is a cross-sectional view schematically showing the image photographing device having the suspension wire for compensating for hand vibration according to the first embodiment of the present invention.
Figure 3A:
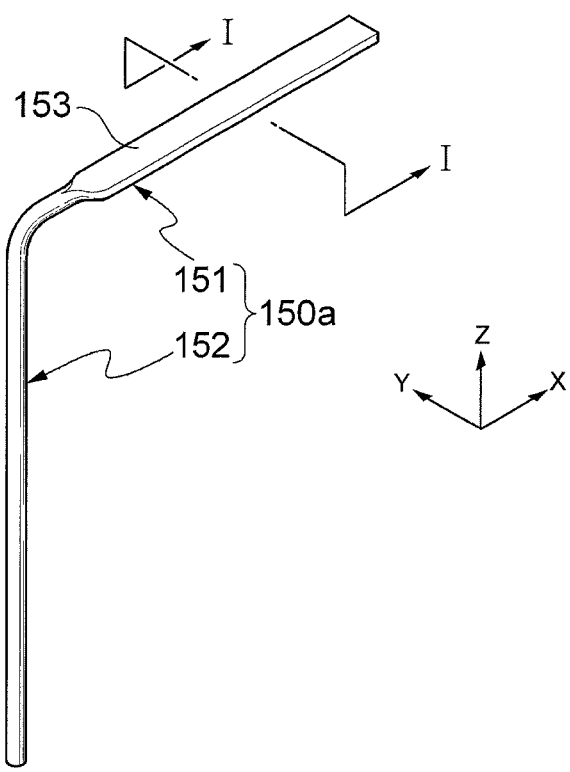
FIG. 3A is a perspective view schematically showing the suspension wire for compensating for hand vibration according to the first embodiment of the present invention.
Figure 3B:
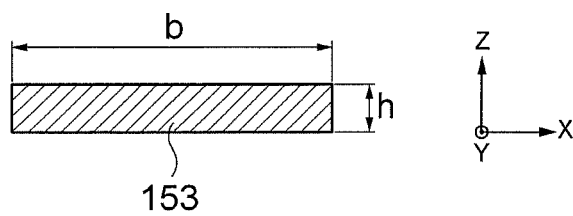
FIG. 3B is a cross-sectional view taken along the line I-I of FIG. 3A.
Figure 4A:
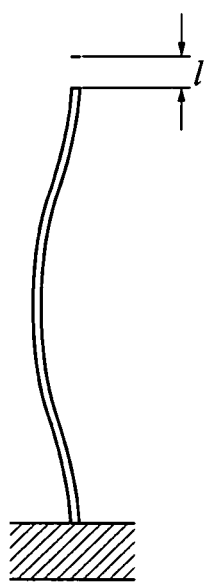
FIGS. 4A to 4C are views comparing deformation amount of the suspension wire for compensating for hand vibration according to the first embodiment of the present invention due to external impact with that of the suspension wire according to the related art.
Figure 4B:
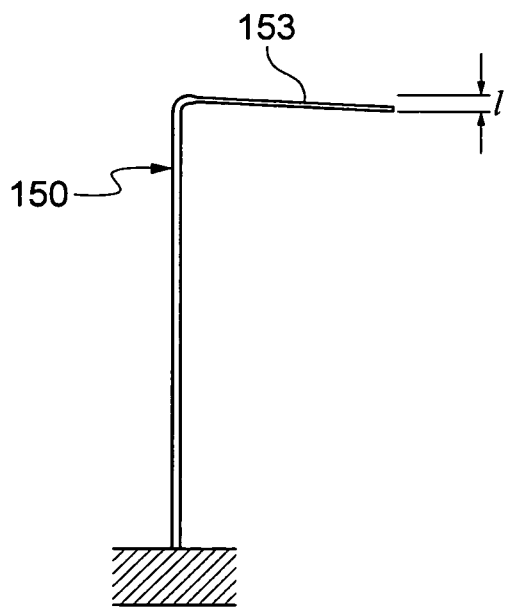
Figure 4C:
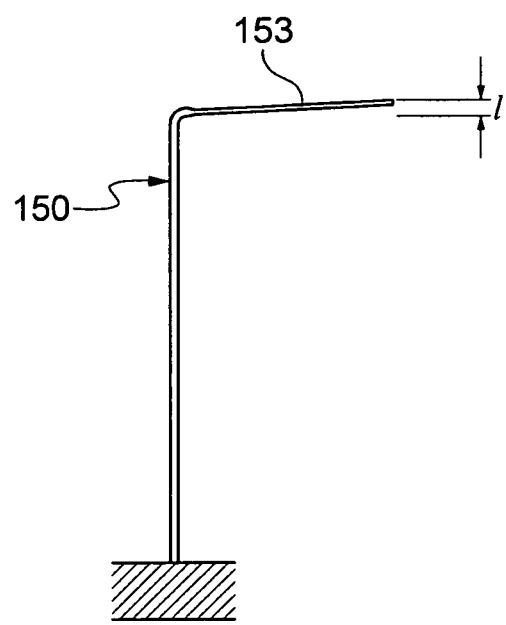

FIG. 1 is an exploded perspective view schematically showing an image photographing device having a suspension wire for compensating for hand vibration according to a first embodiment of the present invention; FIG. 2 is a cross-sectional view schematically showing the image photographing device having the suspension wire for compensating for hand vibration according to the first embodiment of the present invention; FIG. 3A is a perspective view schematically showing the suspension wire for compensating for hand vibration according to the first embodiment of the present invention; FIG. 3B is a cross-sectional view taken along the line I-I of FIG. 3A; FIGS. 4A to 4C are views comparing deformation amount of the suspension wire for compensating for hand vibration according to the first embodiment of the present invention due to external impact with that of the suspension wire according to the related art.

First, referring to FIGS. 1 and 2, an image photographing device 100 according to an exemplary embodiment of the present invention may be configured to include a substrate 110 having an image sensor 111 mounted thereon, a housing 120 having the substrate 110 mounted on a lower portion thereof, an optical unit 130 and a magnet 140 that are received in an inner portion of the housing 120, suspension wires 150 floating and supporting the optical unit 130 in the inner portion of the housing 120, and a shield case 160 covered on an upper portion of the housing 120.

Here, the housing 120 may have a flexible printed circuit board 120 mounted on an outer side thereof, wherein the flexible printed circuit board 125 may enclose the housing 120 and may be electrically connected to the substrate 110 mounted on the lower portion of the housing 120.

The substrate 110 may have the image sensor 111 electrically connected to and mounted at a center of an upper surface thereof through connection by wire bonding, connection by an adhesive, or the like, and may be a printed circuit board, a ceramic substrate, or the like.

Here, the housing 120 may be assembled in parallel with the upper surface of the substrate 110 having the image sensor 111 mounted thereon, and be configured to have a box shape in which upper and lower surfaces thereof are opened.

Therefore, the optical unit 130 and the magnet 140 may be inserted through the opened upper surface of the housing 120, and the image sensor 111 may be received through the opened lower surface of the housing 120.

The housing 120 may have coils 121 mounted on each of the four surfaces thereof having a box shape and wound in one direction, and have the optical unit 130 horizontally movably mounted in an inner center thereof.

Here, the magnets 140 may be insertedly mounted in the inner portion of the housing 120, while being spaced apart by a predetermined interval from an outer side of the optical unit 130, and be disposed at positions corresponding to the coils 121 mounted on a side of the housing 120.

The reason why the coil 121 and the magnet 140 are disposed at the position corresponding to each other is that the optical unit 130 mounted on an inner side of the magnet 140 is relatively horizontally moved with respect to the moving displacement in the inner portion of the housing 120 by electromagnetic force generated due to an electric field generated by a current applied to the coil 121 and a magnetic field generated by the magnet 140.

In this configuration, the current may be applied to the coil 121 through the flexible printed circuit board 125 enclosing the outer side of the housing 120.

Meanwhile, the optical unit 130 may be mounted in a state in which it is floated within the housing 120 by the suspension wires 150 disposed at four corners of a yoke 145.

Here, the suspension wire 150 according to the present embodiment elastically supports movement amount of the optical unit 130 in directions X and Y (hereinafter, referred to hand vibration compensation directions) perpendicular to an optical axis direction Z when moving displacement of the optical unit 130 is generated in the directions X and Y perpendicular to the optical axis direction Z, while serving to elastically support the optical unit 130 within the housing 120, thereby making it possible to smoothly compensate for the hand vibration.

The suspension wire 150 may have a lower end thereof coupled to the bottom of the housing 120 to thereby be electrically connected to the substrate 110 mounted on the lower portion of the housing 120, and have an upper end thereof coupled to the optical unit 130 to thereby apply moving power to the optical unit 130.

Meanwhile, the optical unit 130 may include a bobbin 131, a lens barrel 132 mounted in the bobbin 131, and a moving unit (not shown) vertically moving the lens barrel 132. Power is applied to the moving unit through the suspension wire 150 to adjust an interval between the lens barrel 132 and the image sensor 111 mounted on the substrate 110 while vertically moving the lens barrel 132 mounted in the bobbin 131, thereby making it possible to implement an auto-focusing function of the image photographing device 100 according to the present embodiment.

Here, the moving unit mounted in the optical unit 130 may use a voice coil motor (VCM) scheme, which is a scheme of vertically moving the lens barrel 132 by electromagnetic force generated by the coil and the magnet, an ultrasonic wave motor scheme using a piezoelectric element, a scheme of vertically moving the lens barrel 132 by applying a current to a shape memory alloy, and the like, thereby making it possible to move the lens barrel 132 within the bobbin 121 in an optical axis direction.

The magnet 140 may be coupled to the yoke 145 to thereby be inserted into the housing 120, and the yoke 145 may be configured to have a shape in which it encloses an outer side of the optical unit 130 and have protrusions formed on sides thereof, wherein the protrusions have the magnets 140 easily attached thereto.

Therefore, a direction of magnetic force generated in the magnet 140 is induced to the coil 121 side mounted on the housing 120, such that the magnetic force may be concentrated on the coil 121.

In addition, the shield case 160 may be coupled to an outer portion of the housing 120 having the optical unit 130 and the magnet 140 inserted thereinto to block an external electromagnetic wave while protecting components within the housing 120, such that the external electromagnetic wave does not have an influence on the electromagnetic force generated between the coil 121 and the magnet 140.

In the image photographic device according to the present embodiment, the optical unit 130 is mounted in a state in which it is floated within the housing 120 while maintaining a predetermined interval from the bottom and the inner wall surface of the housing 120.

Here, the optical unit 130 is supported by the suspension unit 150, and the bobbin 131 configuring the optical unit 130 is supported by the upper end of the suspension wire 150, such that the optical unit 130 may be elastically moved within the housing 120 in horizontal directions thereof, that is, the hand vibration compensation directions X and Y.

Here, the optical unit 130 and the housing 120 form a predetermined gap therebetween in order that the optical unit 130 is smoothly elastically moved in the hand vibration compensation directions X and Y. The gap, that is, an interval between the side of the optical unit 130 and the inner wall surface of the housing 120 may be generally about 200 μm, and an interval between a lower surface of the optical unit 130 and the bottom of the housing 120 may be 50 to 100 μm.

When the gap between the optical unit 130 and the housing 120 is designed to be significantly small, the optical unit 130 contacts the housing 120 before the permanent deformation or the fracture of the suspension wire 150 due to the external impact, thereby making it possible to prevent the deformation of the suspension wire 150. However, in this case, there is limitations in that it is difficult to secure a moving space of the optical unit 130 in the hand vibration compensation directions X and Y and it is also difficult to design the gap to be a predetermined or less due to a tolerance, etc., during the assembling of the optical unit 130 and the housing 120.

As described above, in the image photographing device, the optical axis is inclined with respect to a photographing object due to the hand vibration of the user, thereby causing a blurring phenomenon that image quality of a photographed image forming on a light-receiving surface of the image sensor 111 is blurred.

In order to solve this problem, the optical unit 130 is moved in an opposite direction to the inclination direction of the optical axis by the electromagnetic force generated between the coil 121 mounted on the housing 120 and the magnet 140 mounted on the optical unit 130, such that the optical unit 130 is moved in relatively parallel with the light receiving surface of the image sensor 111. Therefore, the image blurring phenomenon may be removed.

Accordingly, when hand vibration is generated, the optical unit 130 is relatively moved with respect to the light receiving surface of the image sensor 111 by electromagnetic force between the coil 121 and the magnet 140 to thereby compensate for hand vibration. Here, the movement of the optical unit 130 may be elastically controlled by the suspension wire 150.

When external impact such as dropping, etc., is applied to the image photographing device, the entire impact amount acting on the optical unit 130 is transferred to the suspension wire 150, such that the suspension wire may be permanently deformed or fractured. Therefore, the optical unit 130 is inclined based on the light reception surface of the image sensor 111, such that the optical unit 130 is not moved in relatively parallel with the light reception surface of the image sensor 111, whereby the image quality implemented by the image sensor may be blurred.

Therefore, when external impact such as dropping, etc., is applied to the image photographing device, that is, when impact force acts on the optical unit 130 in the optical axis direction, the suspension wire 150 according to the present embodiment is configured to flexibly receive the impact force, thereby making it possible to prevent or minimize permanent deformation or fracture of the suspension wire. As a result, the optical unit 130 is smoothly moved in the hand vibration compensation directions X and Y, thereby making it possible to improve durability and reliability for the external impact.

More specifically, referring to FIGS. 3A and 3B, the suspension wire 150 according to the present embodiment may include a wire body 150*a* having both ends thereof each fixed to the optical unit 130 and the housing 120, and a deformation buffer 153 formed in the wire body 150*a* to allow the wire body 150*a* to flexibly receive impact force when external impact is applied to the wire body 150*a*, thereby preventing permanent deformation or fracture of the wire body 150*a*.

Here, the suspension wire 150 according to the present embodiment is formed in a bent shape in which the wire body 150*a* includes a horizontal wire body 151 fixed to the optical unit 130 and a vertical wire body 152 fixed to the housing 120.

The deformation buffer 153 may be formed in at least any one of the horizontal wire body 151 and the vertical wire body 152. However, in the present embodiment, the deformation buffer 153 is formed in the horizontal wire body 151.

In the present embodiment, the wire body 150*a* has a circular cross section or a square cross section. Here, the deformation buffer 153 has the same cross-sectional area as that of the wire body 150*a*; however, it has a cross section having a shape different from that of the wire body 150*a*, for example, a cross section of which a width b and a height h have a different ratio therebetween. That is, the deformation buffer 153 may have a cross section of which the width b in a Y axis direction of the hand vibration compensation directions X and Y perpendicular to the optical axis direction Z is larger than a height h in the optical axis direction Z.

That is, in the suspension wire 150 according to the present embodiment, the cross-sectional area of the deformation buffer 153 is maintained to be the same as that of the wire body 150*a* to thereby smoothly move the optical unit 130 in the hand vibration compensation directions X and Y. In addition, the shape of the cross section of the deformation buffer 153 is changed to thereby prevent or minimize permanent deformation or fracture of the suspension wire 150 due to external impact.

As shown in Table 1 below, the deformation buffer 153 according to the present embodiment has a cross section of which the width b and the height h have a different ratio therebetween, while being maintained to have the same cross-sectional area, as compared to a circular cross section having a radius r and a square cross section of which the width b and the height h have the same ratio therebetween, thereby making it possible to change a cross-sectional secondary moment value.

That is, the deformation buffer 153 is designed to have the cross-sectional secondary moment smaller than those of the circular cross section and the square cross section that have the same cross-sectional area, thereby making it possible to prevent excessive stress from being generated due to external impact, that is, the impact force in the optical axis direction Z. In addition, the deformation buffer 153 has small elasticity to be flexibly elastically moved with respect to bending by the impact force, that is, tensile force or compressive force, such that it is restored while buffering the impact force, thereby making it possible to effectively prevent or minimize permanent deformation or fracture of the suspension wire 150 including the deformation buffer 153 due to external impact.

TABLE 1

| CONDITION | CIRCLE HAVING RADIUS r | b = h | b = 1.5h | b = 2h | b = 3h |
|---|---|---|---|---|---|
| CROSS SECTIONAL SECONDARY MOMENT VALUE | $I = \dfrac{\pi r^4}{4}$ | $I = \dfrac{\pi^2 r^4}{12}$ | $I = \dfrac{\pi^2 r^4}{12 \times 1.5}$ | $I = \dfrac{\pi^2 r^4}{12 \times 2}$ | $I = \dfrac{\pi^2 r^4}{12 \times 3}$ |
| CROSS SECTIONAL SECONDARY MOMENT RATIO | 1 | 1.05 | 0.70 | 0.52 | 0.35 |

Referring FIGS. 4A to 4C, it may be appreciated that while the suspension wire in a linear shape having only a circular cross section according to the related art has large warpage deformation generated with respect to the same supporting height change 1 during a bending operation through the impact force, that is, the tensile force or the compressive force, acting on the suspension wire in the optical axis direction Z due to external impact (See FIG. 4A), the suspension wire 150 having the deformation buffer 153 in a bent shape according to the present embodiment has significantly small warpage deformation generated with respect to the same supporting height change 1 during the bending operation through the impact force, that is, the compressive force (See FIG. 4B) or the tensile force (See FIG. 4C), acting on the suspension wire in the optical axis direction Z due to the same external impact.

FIG. 5 is a view showing a suspension wire according to a second embodiment of the present invention. As shown in FIG. 5, a suspension wire 250 according to the present embodiment is different from the suspension wire according to the first embodiment in that a deformation buffer 253 is extended to a bent portion at which a horizontal wire body 251 and a vertical wire body 252 are connected to each other.

Similar to the first embodiment, in the suspension wire 250 according to the present embodiment, the wire body 250a is formed to have a circular cross section or a square cross section, and the deformation buffer 253 has a cross-sectional shape different from that of the wire body 250a, for example, a cross-sectional shape in which a width b is larger than a height h, while being maintained to have the same cross-sectional area as that of the wire body 250a. Therefore, the warpage deformation is minimized during the bending operation through the impact force, that is, the tensile force or the compressive force, acting on the suspension wire 250 in the optical axis direction Z, thereby making it possible to prevent or minimize permanent deformation or fracture of the suspension wire 250 due to external impact.

In addition, in the suspension wire 250 according to the present embodiment, the deformation buffer 253 is formed to be extended to the bent portion, thereby making it possible to adjust the stiffness of the suspension wire 250 in the hand vibration compensation directions X and Y, while maintaining the elastic movement of the suspension wire 250 in the hand vibration compensation directions X and Y. Furthermore, the deformation buffer 253 is formed to be extended to the bent portion to allow smaller stress to act on the bent portion, as compared to the horizontal wire body 251 and the vertical wire body 252, thereby making it possible to maintain greater stability.

Figure 6:
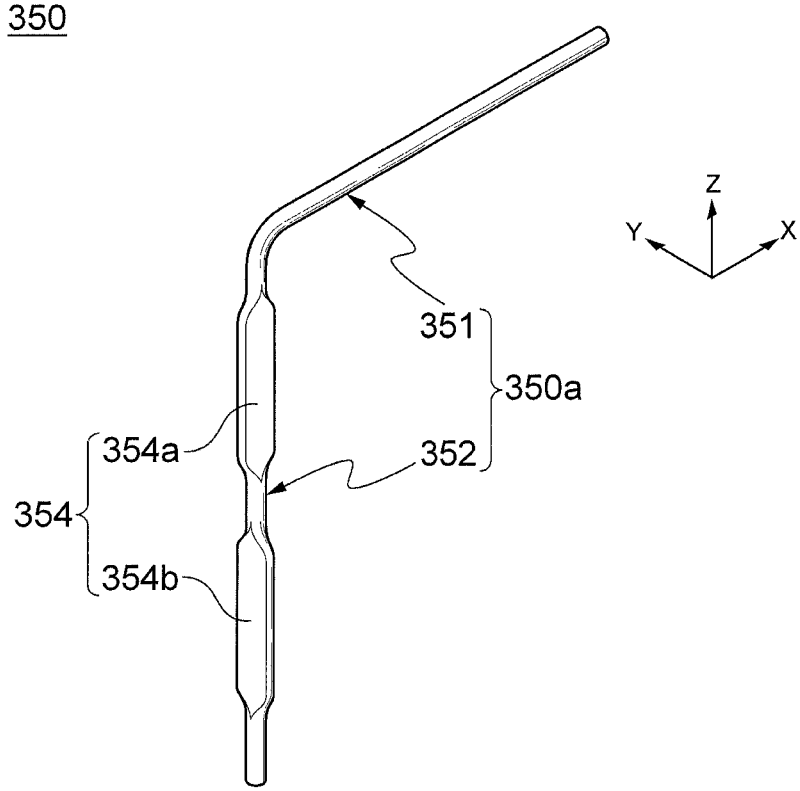
FIG. 6 is a perspective view schematically showing a suspension wire for compensating for hand vibration according to a third embodiment of the present invention.

FIG. 6 is a perspective view schematically showing a suspension wire according to a third embodiment of the present invention. As shown in FIG. 6, a suspension wire 350 according to the present embodiment is formed in a bent shape in which a wire body 350a includes a horizontal wire body 351 and a vertical wire body 352, and includes a deformation buffer 354 formed in the vertical wire body 352.

Here, the deformation buffer 354 may include a first vertical deformation buffer 354a and a second vertical deformation buffer 345b each formed in an upper portion and a lower portion of the vertical wire body 352.

In this configuration, the first vertical deformation buffer 354a and the second vertical deformation buffer 345b may be formed to have cross sections that are rotationally symmetrical to each other by 90 degrees, thereby making it possible to elastically move the vertical wire body 352 in the directions perpendicular to the optical axis direction Z, that is, the hand vibration compensation directions X and Y and flexibly cope with deformation force acting on the vertical wire body 352 due to external impact.

For example, when the suspension wire 350 moves in the X axis direction due to the movement of the optical unit in the X axis direction of the hand vibration compensation directions X and Y, the second vertical deformation buffer 354b moves more elastically than the first vertical deformation buffer 354a, such that the first vertical deformation buffer 354a mainly operates stiffly and the second vertical deformation buffer 354b mainly operates elastically, with respect to the movement of the suspension wire 350 in the X axis direction, thereby making it possible to elastically move the suspension wire 350 while maintaining the stiffness of the suspension wire 350.

In addition, when the suspension wire 350 moves in the Y axis direction due to the movement of the optical unit in the Y axis direction of the hand vibration compensation directions X and Y, the first vertical deformation buffer 354a moves more elastically than the second vertical deformation buffer 354b, such that the first vertical deformation buffer 354a mainly operates elastically and the second vertical deformation buffer 354b mainly operates stiffly, with respect to the movement of the suspension wire 350 in the Y axis direction, thereby making it possible to elastically move the suspension wire 350 while maintaining the stiffness of the suspension wire 350.

Here, the first vertical deformation buffer 354a and the second vertical deformation buffer 354b are formed to have substantially the same length ratio therebetween, without being limited thereto. The first vertical deformation buffer 354a and the second vertical deformation buffer 354b may also have a different length ratio therebetween according to design conditions.

Although not shown in detail, the suspension wire 350 according to the present embodiment further includes a deformation buffer formed in the horizontal wire body 351, thereby making it possible to effectively prevent or minimize permanent deformation or fracture of the suspension wire due to external impact. In addition, the entire shape of the suspension wire including the deformation buffer may serve to prevent permanent deformation or fracture of the suspension wire during external impact, rather than only the deformation buffer.

The deformation buffer 354 according to the present embodiment may also have substantially the same cross-sectional structure as the deformation buffer according to the above-mentioned embodiment. Therefore, a detail description thereof will be omitted.

Figure 7:
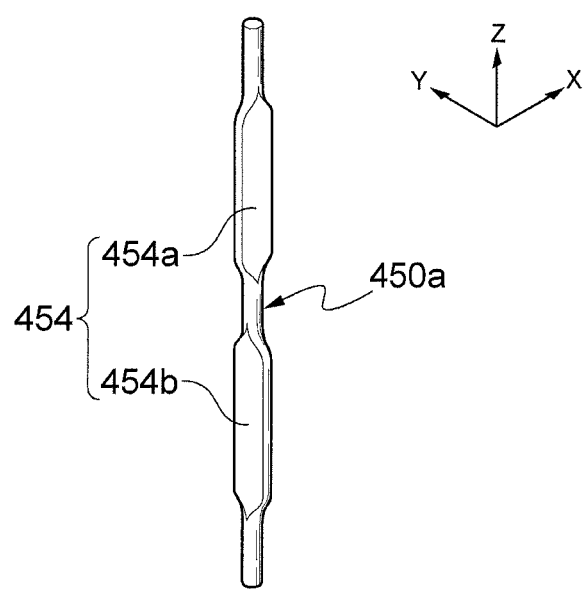
FIG. 7 is a perspective view schematically showing a suspension wire for compensating for hand vibration according to a fourth embodiment of the present invention.

FIG. 7 is a view showing a suspension wire according to a fourth embodiment of the present invention. As shown in FIG. 7, a suspension wire 450 according to the present embodiment is formed to have an up-right shape in which a wire body 450a is configured of only a vertical wire body, unlike the bent shape in the third embodiment. That is, the suspension wire 450 is formed to have a shape in which an upper end of the wire body 450a is fixed to the optical unit and a lower end thereof is fixed to the housing.

Therefore, a deformation buffer 454 according to the present embodiment is formed between the upper and lower ends of the wire body 450a.

Here, the deformation buffer 454 may include a first vertical deformation buffer 454a and a second vertical deformation buffer 454b each formed in an upper portion and a lower portion of the wire body 450a.

As described above, the first vertical deformation buffer 454a and the second vertical deformation buffer 454b may be formed to have cross sections that are rotationally symmetrical to each other by 90 degrees, thereby making it possible to elastically move the wire body 450a in the directions perpendicular to the optical axis direction Z, that is, the hand vibration compensation directions X and Y and flexibly cope with deformation force acting on the wire body 450a due to external impact.

An acting effect and a length ratio of the first vertical deformation buffer 454a and the second vertical deformation buffer 454b of the suspension wire 450 with respect to the hand vibration compensation directions X and Y in the present embodiment are similar to those of the above-mentioned third embodiment. Therefore, a detailed description thereof will be omitted.

In addition, the deformation buffer 454 according to the present embodiment may also have substantially the same cross-sectional structure as the deformation buffer according to the above-mentioned embodiment. Therefore, a detail description thereof will be omitted. However, the deformation buffer 454 according to the present embodiment is different from the deformation buffer according to the above-mentioned embodiment in that it may have a cross-sectional area larger than that of the deformation buffer according to the above-mentioned embodiment. That is, the deformation buffer according to the above-mentioned embodiment has the bent portion, such that when the suspension wire has impact applied thereto in the Z axis direction, the bent portion may serve to absorb the impact. However, the deformation buffer according to the present embodiment has a large wire cross-sectional area instead of the bent portion, thereby making it possible to prevent deformation or fracture due to the tensile force and compressive force. In this case, the stiffness of the suspension wire in the X and Y directions increased due to the increase in the cross-sectional area may be reduced to the stiffness of the suspension wire according to the above-mentioned embodiment in the X and Y directions by adjusting the ratio between a width b and a height h of the deformation buffer 454.

Figure 8:
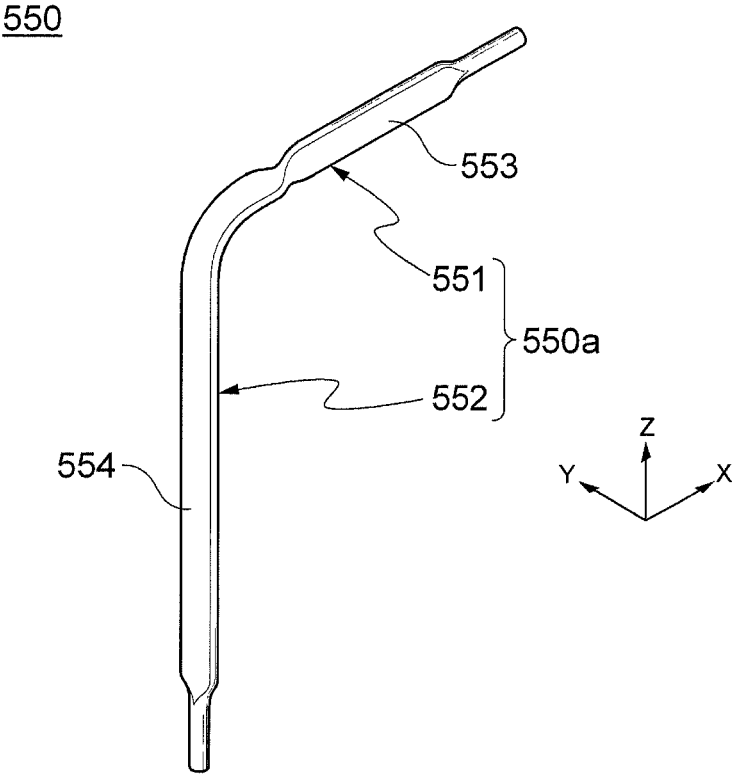
FIG. 8 is a perspective view schematically showing a suspension wire for compensating for hand vibration according to a fifth embodiment of the present invention.

FIG. 8 is a perspective view schematically showing a suspension wire for compensating for hand vibration according to a fifth embodiment of the present invention. A suspension wire 550 according to the present embodiment is formed in a bent shape in which a wire body 550a includes a horizontal wire body 551 and a vertical wire body 552, and includes deformation buffers 553 and 554 formed in the horizontal wire body 551 and the vertical wire body 552.

That is, the deformation buffers 553 and 554 according to the present embodiment may include a horizontal deformation buffer 553 formed in the horizontal wire body 551 and a vertical deformation buffer 554 formed in the vertical wire body 552.

In this configuration, the horizontal deformation buffer 553 and the vertical deformation buffer 554 may be formed to have cross sections that are rotationally symmetrical to each other by 90 degrees. That is, the horizontal deformation buffer 553 may be formed to have a cross section in a rectangular flat shape having a long side in the vertical direction (Z direction), and the vertical deformation buffer 554 may be formed to have a cross section in a rectangular flat shape having a long side in the horizontal direction (Y direction). Further, in the suspension wire 550 according to the present embodiment, the vertical deformation buffer 554 may be formed to be extended to a bent portion.

Therefore, when the suspension wire 550 according to the present embodiment has impact applied thereto in the X axis direction or the Z axis direction, the vertical deformation buffer 554 and the bent portion having the vertical deformation buffer formed to be extended thereto are elastically deformed, thereby making it possible to prevent permanent deformation or fracture of the suspension wire. In addition, when the suspension wire 550 according to the present embodiment has impact applied thereto in the Y axis direction, the horizontal deformation buffer 553 and the bent portion are elastically deformed, thereby making it possible to prevent permanent deformation or fracture of the suspension wire.

As described above, in the suspension wire according to the present invention, when the wire body is formed in a bent shape in which it includes the horizontal wire body and the vertical wire body, the deformation buffer is formed in the horizontal wire body and the vertical wire body and is formed to be extended to the bent portion, thereby making it possible to effectively prevent or minimize permanent deformation or fracture of the suspension wire due to external impact. In addition, the entire shape change structure of the suspension wire including the deformation buffer may serve to prevent permanent deformation or fracture of the suspension wire during external impact, rather than only the deformation buffer.

As described above, with the suspension wire and the image photographing device having the same according to the present invention, the deformation buffer is formed in the wire body supporting the optical unit to prevent excessive stress to act on the suspension wire due to external impact while smoothly maintaining moving performance of hand vibration compensation, thereby making it possible to prevent or minimize the permanent deformation or the fracture of the suspension wire.

In addition, with the suspension wire and the image photographing device having the same according to the present invention, the permanent deformation or the fracture of the suspension wire is prevented or minimized, thereby making it possible to increase durability of a product. Further, in addition to the suspension wire, a separate guide or ball bearing for floating and supporting the optical unit within the housing is excluded, thereby making it possible to miniaturize the product.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. An image photographing device comprising:
   an optical unit;
   a housing having the optical unit received therein; and
   a suspension wire for compensating for hand vibration mounted between the optical unit and the housing so as to have a length thereof in an optical axis direction to float and support the optical unit within the housing,
   the suspension wire being for compensating for hand vibration, the suspension wire including
   a wire body having both ends thereof each fixed to the optical unit and the housing, and
   a deformation buffer formed in the wire body to allow the wire body to receive impact force when external impact is applied to the wire body,
   the deformation buffer having a cross section of which a width and a height have a different ratio therebetween, and the cross section of the deformation buffer being different from other parts of the wire body.

2. The image photographing device according to claim 1, wherein the wire body is formed in a shape in which each of upper and lower ends thereof is fixed to the optical unit and the housing, and the deformation buffer is formed between the upper and lower ends of the wire body.

3. The image photographing device according to claim 1, wherein the deformation buffer includes a first deformation buffer and a second deformation buffer each formed in upper and lower portions of the wire body.

4. The image photographing device according to claim 3, wherein the first and second deformation buffers have cross sections that form a predetermined angle therebetween.

5. The image photographing device according to claim 4, wherein the first and second deformation buffers have cross sections that are rotationally symmetrical to each other by 90 degrees.

6. The image photographing device according to claim 1, wherein the wire body is formed in a bent shape in which it includes a horizontal wire body fixed to the optical unit and a vertical wire body fixed to the housing, and the deformation buffer is formed in at least any one of the horizontal wire body and the vertical wire body.

7. The image photographing device according to claim 6, wherein the deformation buffer includes at least any one of a horizontal deformation buffer formed in the horizontal wire body and a vertical deformation buffer formed in the vertical wire body.

8. The image photographing device according to claim 7, wherein the horizontal deformation buffer is formed to be extended to a bent portion at which the horizontal wire body and the vertical wire body are connected to each other.

9. The image photographing device according to claim 7, wherein the vertical deformation buffer includes a first vertical deformation buffer and a second vertical deformation buffer each formed in upper and lower portions of the vertical wire body.

10. The image photographing device according to claim 9, wherein the first and second deformation buffers have cross sections that form a predetermined angle therebetween.

11. The image photographing device according to claim 10, wherein the first and second vertical deformation buffers have cross sections that are rotationally symmetrical to each other by 90 degrees.

12. A suspension wire for compensating for hand vibration, which is mounted between an optical unit and a housing so as to have a length thereof in an optical axis direction to float and support the optical unit within the housing, the suspension wire comprising
   a wire body having both ends thereof each fixed to the optical unit and the housing; and
   a deformation buffer formed in the wire body to allow the wire body to receive impact force when external impact is applied to the wire body,
   the deformation buffer having a cross section of which a width and a height have a different ratio therebetween, and the cross section of the deformation buffer being different from other parts of the wire body.

* * * * *